US012693822B2

(12) United States Patent (10) Patent No.: US 12,693,822 B2
Gesiriech et al. (45) Date of Patent: Jul. 28, 2026

(54) SYSTEM AND METHOD FOR VISUAL FEEDBACK

(71) Applicant: Leidos Security Detection & Automation, Inc., Tewksbury, MA (US)

(72) Inventors: Gannon P. Gesiriech, Carlsbad, CA (US); Andrew Dean Foland, Wellesley, MA (US)

(73) Assignee: Leidos Security Detection & Automation, Inc., Tewksbury, MA (US)

( * ) Notice: Subject to any disclaimer, the term of this patent is extended or adjusted under 35 U.S.C. 154(b) by 0 days.

(21) Appl. No.: 18/916,302

(22) Filed: Oct. 15, 2024

(65) Prior Publication Data

US 2025/0123784 A1 Apr. 17, 2025

Related U.S. Application Data

(60) Provisional application No. 63/590,685, filed on Oct. 16, 2023.

(51) Int. Cl.
| | |
|---|---|
| *G06V 20/52* | (2022.01) |
| *G06F 3/14* | (2006.01) |
| *G06T 5/50* | (2006.01) |
| *G06V 10/25* | (2022.01) |
| *G06V 20/70* | (2022.01) |

(52) U.S. Cl.
CPC ................ *G06F 3/14* (2013.01); *G06T 5/50* (2013.01); *G06V 10/25* (2022.01); *G06V 20/70* (2022.01); *G06T 2207/20084* (2013.01); *G06T 2207/20221* (2013.01); *G06V 2201/07* (2022.01)

(58) Field of Classification Search
CPC .......... G06F 3/14; G06V 10/25; G06V 20/70; G06V 20/52; G06V 2201/07; G06T 5/50; G06T 2207/20084; G06T 2207/20221
See application file for complete search history.

(56) References Cited

U.S. PATENT DOCUMENTS

| | | | |
|---|---|---|---|
| 10,366,293 | B1 | 7/2019 | Faviero et al. |
| 11,010,605 | B2 | 5/2021 | Nord et al. |
| 2016/0295171 | A1* | 10/2016 | Van Den Brink ..... G06V 20/52 |
| 2018/0137644 | A1* | 5/2018 | Rad ...................... G06V 10/242 |

(Continued)

OTHER PUBLICATIONS

Liu et al., Concealed Object Detection for Activate Millimeter Wave Image. IEEE Transactions on Industrial Electronics. Dec. 2019;66(12):9909-9917.

(Continued)

*Primary Examiner* — Stephen G Sherman

(74) *Attorney, Agent, or Firm* — McCarter & English, LLP

(57) ABSTRACT

Systems, methods, and computer program products are provided for providing feedback. An image of an individual is received. At least one item associated with the individual in the image of the individual is detected using a trained machine learning model. The at least one item is one of a plurality of items of interest. The trained machine learning model takes as an input the image of the individual and generates as an output an indicator of the at least one item of interest detected. A recommendation is generated responsive to detecting the item. The divestiture recommendation is then presented to the individual.

21 Claims, 8 Drawing Sheets

(56) References Cited

U.S. PATENT DOCUMENTS

| 2020/0193166 A1* | 6/2020 | Russo | .................... G06V 20/52 |
| 2020/0193666 A1 | 6/2020 | Cinnamon et al. | |
| 2021/0034865 A1* | 2/2021 | Nord | .................... G06F 18/254 |
| 2021/0312201 A1* | 10/2021 | Hastings | ................ G06V 20/10 |

OTHER PUBLICATIONS

International Search Report and Written Opinion for Application No. PCT/US2024/051356, dated Jan. 31, 2025, 11 pages.

* cited by examiner

800

Receive an Image of an Individual From a Camera — 802

Detect a Divesture Item Associated with the Individual in the Image of the Individual Using the Trained Machine Learning Model — 804

Generate a Divesture Recommendation Responsive to Detecting the Divesture Item — 806

Present the Divesture Recommendation to the Individual — 808

SYSTEM AND METHOD FOR VISUAL FEEDBACK

CROSS REFERENCE TO RELATED APPLICATIONS

The present application is related to the Provisional Patent Application Ser. No. 63/590,685 entitled, "SYSTEM AND METHOD FOR VISUAL FEEDBACK" filed Oct. 16, 2023, the contents of which are incorporated by reference herein.

BACKGROUND

Non-contact screening is an important tool to detect the presence of contraband or hazardous items being carried by an individual entering a restricted area, such as a secure building or a transportation hub, such as an airport, or a train station. Various technologies have been used for non-contact screening including x-ray and millimeter-wave imaging. Such technologies can be used to produce images that reveal hidden objects carried on a person that are not visible to plain sight. In many cases, efficiency of the non-contact screening can be improved by providing specific pre-inspection feedback to inspectees regarding items they may be carrying.

SUMMARY

According to an embodiment, a system providing visual feedback to individuals at a security checkpoint is provided. The system includes a camera, a display, and a processing system. The processing system includes a memory storing computer readable instructions and a trained machine learning model. The processing system further includes a processing device for executing the computer readable instructions, the computer readable instructions controlling the processing device to perform operations. The operations include receiving an image of an individual from the camera. The operations further include detecting at least one item associated with the individual in the image of the individual using the trained machine learning model, the at least one item being one of a plurality of items of interest, the trained machine learning model taking as an input the image of the individual and generating as an output an indicator of the at least one item of interest detected. The operations further include generating a recommendation responsive to detecting the item. The operations further include presenting, on the display, the recommendation to the individual as the visual feedback.

According to an embodiment, a system for providing auditory feedback to individuals at a security checkpoint is provided. The system includes a camera, a speaker, and a processing system. The processing system includes a memory storing computer readable instructions and a trained machine learning model. The processing system further includes a processing device for executing the computer readable instructions, the computer readable instructions controlling the processing device to perform operations. The operations include receiving an image of an individual from the camera. The operations further include detecting at least one item associated with the individual in the image of the individual using the trained machine learning model, the at least one item being one of a plurality of items of interest, the trained machine learning model taking as an input the image of the individual and generating as an output an indicator of the at least one item of interest detected. The operations further include generating a recommendation responsive to detecting the item. The operations further include presenting, using the speaker, the recommendation to the individual as the auditory feedback.

According to an embodiment, a computer-implemented method for providing visual feedback to individuals at a security checkpoint is provided. The computer-implemented method includes receiving an image of an individual. The computer-implemented method further includes detecting at least one item associated with the individual in the image of the individual using a trained machine learning model, the at least one item being one of a plurality of items of interest, the trained machine learning model taking as an input the image of the individual and generating as an output an indicator of the at least one item of interest detected. The computer-implemented method further includes generating a recommendation responsive to detecting the item. The computer-implemented method further includes presenting, on a display, the divestiture recommendation to the individual as the visual feedback.

According to an embodiment, a computer program product is provided. The computer program product includes a computer readable storage medium having program instructions embodied therewith, the program instructions executable by a processor to cause the processor to perform operations for providing visual feedback to individuals at a security checkpoint. The operations include receiving an image of an individual from a camera. The operations further include detecting at least one item associated with the individual in the image of the individual using a trained machine learning model, the at least one item being one of a plurality of items of interest, the trained machine learning model taking as an input the image of the individual and generating as an output an indicator of the at least one item of interest detected. The operations further include generating a recommendation responsive to detecting the item. The operations further include presenting, on the display, the recommendation to the individual as the visual feedback.

BRIEF DESCRIPTION OF DRAWINGS

Illustrative embodiments are shown by way of example in the accompanying drawings and should not be considered as a limitation of the present disclosure.

DETAILED DESCRIPTION

Figure 1:
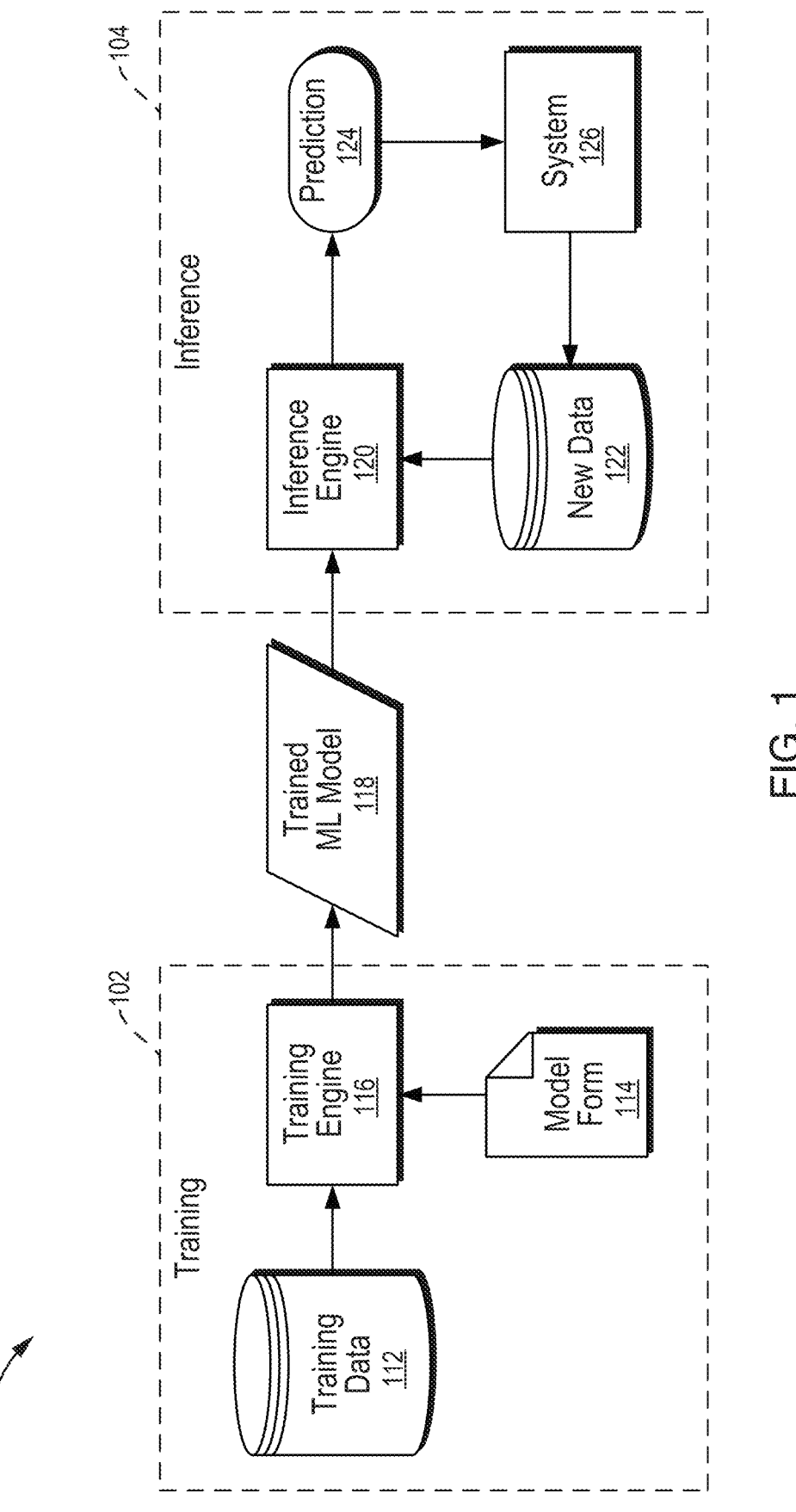
FIG. 1 depicts a block diagram of components of a machine learning training and inference system according to one or more embodiments described herein.

Described in detail herein are systems and methods for providing visual feedback to screened individuals regarding their carried items—i.e., divestiture recommendations. More particularly, one or more embodiments described herein provide an automated system that detects clothing, footwear and objects worn by an individual that need to be removed for the purpose of non-intrusive screening of the individual and automatically recommends, via visual feedback at a security checkpoint, that such objects are divested (i.e., removed from the body of the individual), such as by instructing the individual to do so. Clothing, footwear and objects are referred to as "divestiture items." Examples of divestiture items include, but are not limited to, belts, glasses, jackets, hats, gloves, watches, and shoes. In some embodiment, the divestiture items can include alternative or additional items, such as scarfs, hair accessories, mobile phones, tablets, and/or the like including combinations and/or multiples thereof.

Non-contact screening devices (also referred to simply as "scanners"), such as a body scanner, can be used to scan an object (e.g., an item or an individual) for contraband, hazardous materials, and/or the like including combinations and/or multiples thereof. For example, in an airport environment, a body scanner can be used to scan passengers (e.g., individuals) before the passengers are permitted access to a restricted area. As another example, in a data center environment, a body scanner can be used to scan technicians (e.g., individuals) before the technicians are permitted access to the data center. In these cases and others, it may be desirable to detect the presence of an undesirable object (e.g., an item or individual) within the body scanner. Further, scanners can be used to screen baggage, luggage, and/or the like. For example, at an airport environment, a passenger may have luggage, and the luggage is screened by a baggage scanner.

In some cases, items (e.g., divestiture items) worn by an individual should be removed (e.g., divested) prior to the individual being scanned by a body scanner. Often, item divestiture recommendations are communicated to the individual in the form of fixed signage and/or an operator (e.g., a security officer) recommending a user divest certain items. Fixed signage is signage static in that it does not change dynamically (e.g., responsive to an observed condition). An example of a fixed sign is a pre-printed sign with static instructions (e.g., "Remove your jacket and shoes before entering the scanner."). Although fixed signage is useful, some individuals need more specific instructions. These specific instructions are usually given by the security officer. Although this approach can be somewhat effective, such approach requires security officer attention and may not be scalable without scaling the workforce. Further, in some situations, a user may not speak a language or languages used on the signs or spoken by a security officer.

Accordingly, one or more embodiments described herein provide automated divestiture recommendations/instructions through visual feedback at a security checkpoint without the need for a security officer or other individual to provide divestiture recommendations/instructions. One or more embodiments described herein provide for capturing an image of an individual, detecting a divestiture item associated with the individual using a trained machine learning model, generating a divestiture recommendation/instruction, and presenting the divestiture recommendation/instruction to the individual. For example, a camera can capture an image of an individual wearing, among other things, a coat and a hat, which may be considered divestiture items. The trained machine learning model can be used to detect that the individual is wearing the coat and the hat. A divestiture recommendation can then be made, such as to instruct the individual to remove the divestiture item(s) (e.g., to remove the coat and hat), and can be presented (visually and/or audibly) to the individual to indicate to the individual to remove the coat and hat.

One or more of the embodiments described herein can be implemented in airport environments and/or non-airport environments. An operator that aids in the divestiture operations described herein can be a security officer, such as a transportation security officer (TSO), or can be other than a security officer.

One or more embodiments described herein can utilize machine learning techniques to perform tasks, such as providing divestiture recommendations. More specifically, one or more embodiments described herein can incorporate and utilize rule-based decision making and artificial intelligence (AI) reasoning to accomplish the various operations described herein, namely providing divestiture recommendations. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for providing divestiture recommendations, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of providing divestiture recommendations as described herein.

Systems for training and using a machine learning model are now described in more detail with reference to FIG. 1. Particularly, FIG. 1 depicts a block diagram of components of a machine learning training and inference system 100 according to one or more embodiments described herein. The machine learning training and inference system 100 performs training 102 and inference 104. During training 102, a training engine 116 trains a model (e.g., the trained machine learning (ML) model 118) to perform a task, such as to provide divestiture recommendations. Inference 104 is the process of implementing the trained ML model 118 to perform the task, such as to provide divestiture recommendations, in the context of a larger system (e.g., a system 126). All or a portion of the machine learning training and inference system 100 shown in FIG. 1 can be implemented, for example by all or a subset of the system 126 of FIG. 2. The system 126 is also referred to as a "divestiture recommendation system."

The training 102 begins with training data 112, which may be structured or unstructured data. According to one or more embodiments described herein, the training data 112 includes images of individuals wearing different articles of clothing including jackets as well as accessories like belts, bags, glasses, hats, scarves, jewelry, and the like. In the case of supervised learning, the images can include labels associated with various articles associated with the individual, such as belts, glasses, jackets, hats, gloves, watches, and shoes. In some embodiment, the divestiture items can include alternative or additional items, such as scarfs, hair accessories, mobile phones, tablets, and/or the like including combinations and/or multiples thereof. The training engine 116 receives the training data 112 and a model form 114. The model form 114 represents a base model that is untrained. The model form 114 can have preset weights and biases, which can be adjusted during training. It should be appreciated that the model form 114 can be selected from many different model forms depending on the task to be performed. For example, where the training 102 is to train a model to provide divestiture recommendations, the model form 114 may be a model form of a CNN, such as a region based CNN (R-CNN). A R-CNN takes as input an image and generates one or more bounding boxes as output, where each bounding box indicates an object associates a predicted label for the object. The model may also be of the form of a Mask-R-CNN, which takes as input an image and outputs a pixel mask indicating a detected object. According to one or more embodiments described herein, the model form 114 can be a pre-trained model, which can be fine-tuned using the training 102. According to one or more embodiments described herein, the model form 114 is a pre-trained model trained on a dataset of images for clothing or images of individuals wearing clothing or both, and the training 102 can include fine-tuning the pre-trained model to identify particular items of clothing or accessories or both (e.g., divestiture items). According to one or more embodiments described herein, the training 102 can be a zero shot multi-modal approach for a list of classes (e.g., the divestiture list classes of items, such as those items shown in FIGS. 4A and 4B). The pre-trained model is capable of detecting these items, but items not on the divestiture list are not explicitly detected. For example, where a multimodal model is trained on both images and language and the model are trained to recognize certain items (e.g., hats), the model understands how to identify a "blue hat" responsive to a query "identify blue hats" without being trained specifically on blue hats.

The training 102 can be supervised learning, semi-supervised learning, unsupervised learning, reinforcement learning, and/or the like, including combinations and/or multiples thereof. For example, supervised learning can be used to train a machine learning model to identify and classify an article associated with an individual in an image of the individual. To do this, the training data 112 includes labeled images, including images of the individual with associated labels (ground truth) for articles associated with the individual (e.g., jackets, hats, and/or the like including combinations and/or multiples thereof) and other images that do not include the articles with associated labels. In this example, the training engine 116 takes as input a training image, or, for example. a feature vector representing the image from the training data 112, makes a prediction for identifying and labeling the articles, and compares the prediction to the known label (ground truth). The training engine 116 then adjusts weights and/or biases of the model based on results of the comparison, such as by using backpropagation. The training 102 may be performed multiple times (referred to as "epochs") until a suitable model is trained (e.g., the trained ML model 118).

Once trained, the trained ML model 118 can be used to perform inference 104 to perform a task, such as to provide divestiture recommendations. The inference engine 120 applies the trained ML model 118 to new data 122 (e.g., real-world, non-training data). For example, if the trained ML model 118 is trained to provide divestiture recommendations, the new data 122 can be an image of an individual attempting to perform a divestiture operation, where the image was not part of the training data 112. In this way, the new data 122 represents data to which the model 118 has not been exposed. The inference engine 120 makes a prediction 124 (e.g., a classification of an object in an image of the new data 122) and passes the prediction 124 to the system 126. The system 126 can, based on the prediction 124, taken an action, perform an operation, perform an analysis, and/or the like, including combinations and/or multiples thereof.

In accordance with one or more embodiments, the predictions 124 generated by the inference engine 120 are periodically monitored and verified to ensure that the inference engine 120 is operating as expected. Based on the verification, additional training 102 may occur using the trained ML model 118 as the starting point. The additional training 102 may include all or a subset of the original training data 112 and/or new training data (e.g., the new data 122). In accordance with one or more embodiments, the training 102 includes updating the trained ML model 118 to account for changes in expected input data.

Figure 2:
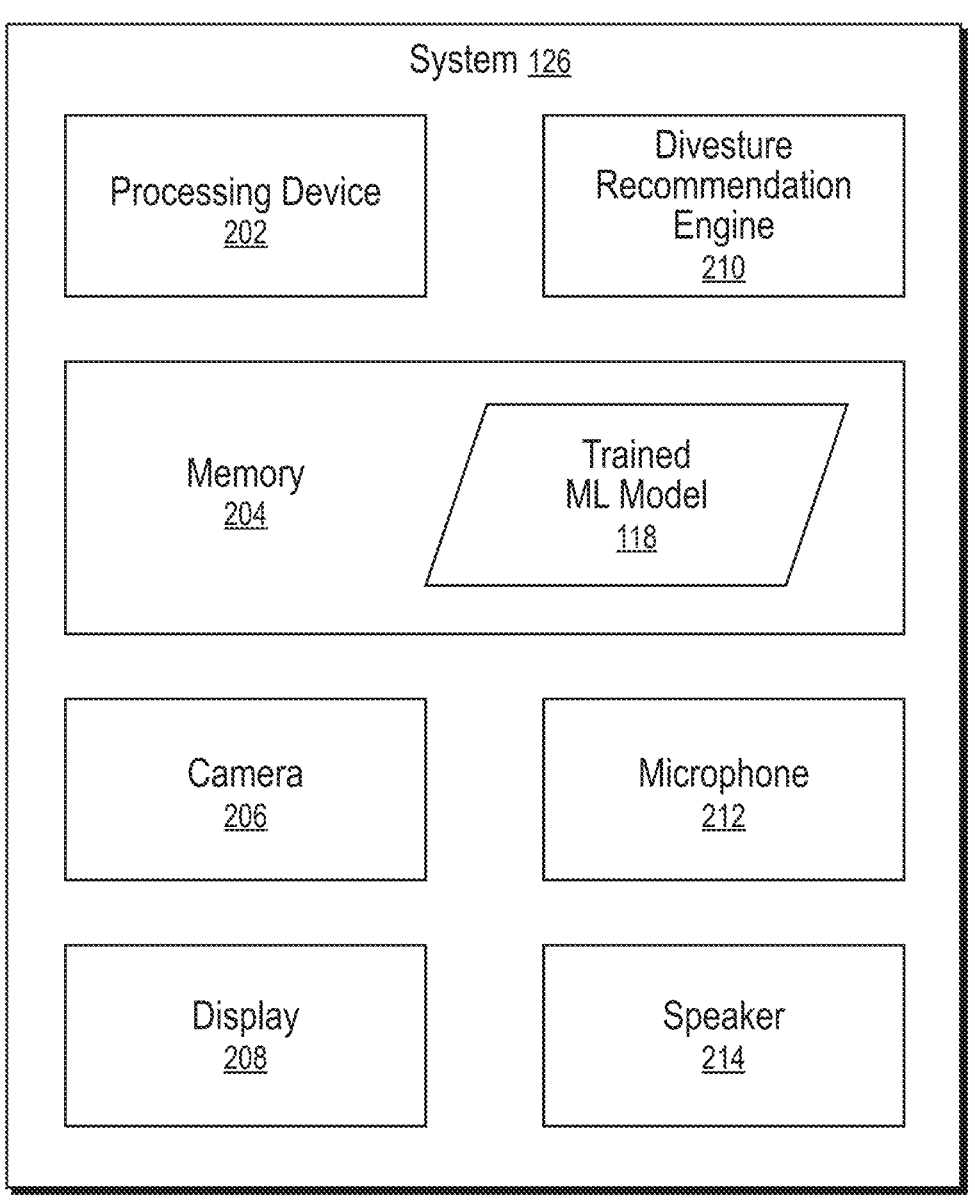
FIG. 2 illustrates the system of FIG. 1 for providing divestiture recommendations according to one or more embodiments described herein.

Referring now to FIG. 2, the system 126 is shown in more detail according to one or more embodiments described herein. The system 126, which may also be referred to as a "processing system," provides divestiture recommendations according to one or more embodiments described herein.

The system 126 includes a processing device 202, a memory 204, a camera 206, a display 208, and a divestiture recommendation engine 210. In other embodiments, the system 126 can include additional components, such as a microphone 212 to capture audio, a speaker 214 to generate audio, an input device (not shown) to enable a user to enter information and interact with the system 126, and/or the like including combinations and/or multiples thereof.

The processing device 202 is any suitable device for executing instructions and/or performing processing functions. The processing device 202 can be a single core or multicore processor. The processing device 202 can be a microprocessor, central processing unit (CPU), special-purpose processing hardware, and/or the like including combinations and/or multiples thereof.

The memory 204 is any suitable device for storing data and/or machine executable instructions. The memory 204 can be a volatile and/or a non-volatile memory. According to one or more embodiments described herein, the memory 204 can represent multiple memories and/or multiple types of memories. According to one or more embodiments described herein, the memory 204 can store the trained ML model 118, which is trained to detect a divestiture item associated with an individual in an image of the individual. The divestiture item is one of a plurality of divestiture items on a divestiture list. More particularly, the trained ML model 118 takes as an input the image of the individual, for example, a feature vector representing the image of the individual and generates as an output an indicator of the divestiture item and a label for the divestiture item.

The camera 206 is any suitable device for capturing images and/or video. For example, the camera 206 can be a visible light camera and can capture still images and/or video.

The display 208 can be any suitable device for displaying images, interfaces, text, and/or the like including combinations and/or multiples thereof. For example, the display 208 can be a light-emitting diodes (LED) display. According to one or more embodiments described herein, the display 208 can be a touch-sensitive display in that the display can receive input from a user via touch by the user.

The divestiture recommendation engine 210 receives the image of the individual from the camera 206. The divestiture recommendation engine 210 performs the inference 104 and can perform one or more functions of the inference engine 120. For example, the divestiture recommendation engine 210 detects a divestiture item associated with the individual in the image of the individual using the trained ML model 118. The divestiture item is one of a plurality of divestiture items on a divestiture list. Examples of divestiture items include, but are not limited to, belts, glasses, jackets, hats, gloves, watches, and shoes. In some embodiment, the divestiture items can include alternative or additional items, such as scarfs, hair accessories, mobile phones, tablets, footwear, and/or the like including combinations and/or multiples thereof. The trained ML model 118 takes as an input the image of the individual, or, for example, a feature vector representing the image of the individual and generates as an output an indicator of the divestiture item and a label for the divestiture item. For example, if the individual is wearing a jacket, the divestiture recommendation engine 210 can detect that the user is wearing the jacket and can generate an indicator for the jacket and in some embodiments a label (e.g., "jacket") for the jacket. The indicator, which can be rendered on the display 208, can be a bounding box around the item, a mask overlaid on the item, an outline around the item, an avatar showing the item in a particular color compared to the rest of the avatar and/or the like including combinations and/or multiples thereof. The divestiture recommendation engine 210 generates a divestiture recommendation (e.g., remove the jacket) responsive to detecting the divestiture item. The divestiture recommendation can be presented on the display 208. As an example, the divestiture recommendation is presented as an instruction to the individual to instruct the individual to remove the divestiture item (e.g., "Please remove your jacket."). As another example, the divestiture recommendation is presented as the indicator showing the divestiture item (e.g., a mask of the jacket, a bounding box around the jacket, and/or the like including combinations and/or multiples thereof). As another example, the divestiture recommendation is an animation showing a virtual representation of a person removing a jacket. As another example, the divestiture recommendation engine 210 can show on the display 208 a live view of the individual and can superimpose the divestiture recommendation as a mask on the jacket or a bounding box around the jacket and in some embodiments with an instruction to remove the jacket (e.g., "Please take off your jacket."). According to one or more embodiments described herein, the instruction can be presented visually (e.g., as text, as an animation, as a video) and/or aurally (e.g., as spoken instructions).

According to one or more embodiments described herein, the system 126 can include the microphone 212 and/or the speaker 214. The microphone 212 can be any suitable device for converting sound into an electrical signal. The speaker 214 can be any suitable device for outputting audio by converting an electrical audio signal into a sound.

The various engines shown in FIG. 2 (e.g., the divestiture recommendation engine 210) can be implemented as instructions stored on a non-transitory computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and machine readable code. The machine readable code can be processor executable instructions stored on a tangible memory, and the hardware can include the processing device 202 for executing those instructions. Thus, the memory 204 can store machine readable instructions that when executed by the processing device 202 implement the engines described herein. Other engines can also be utilized to include other features and functionality described in other examples herein.

Figure 3:
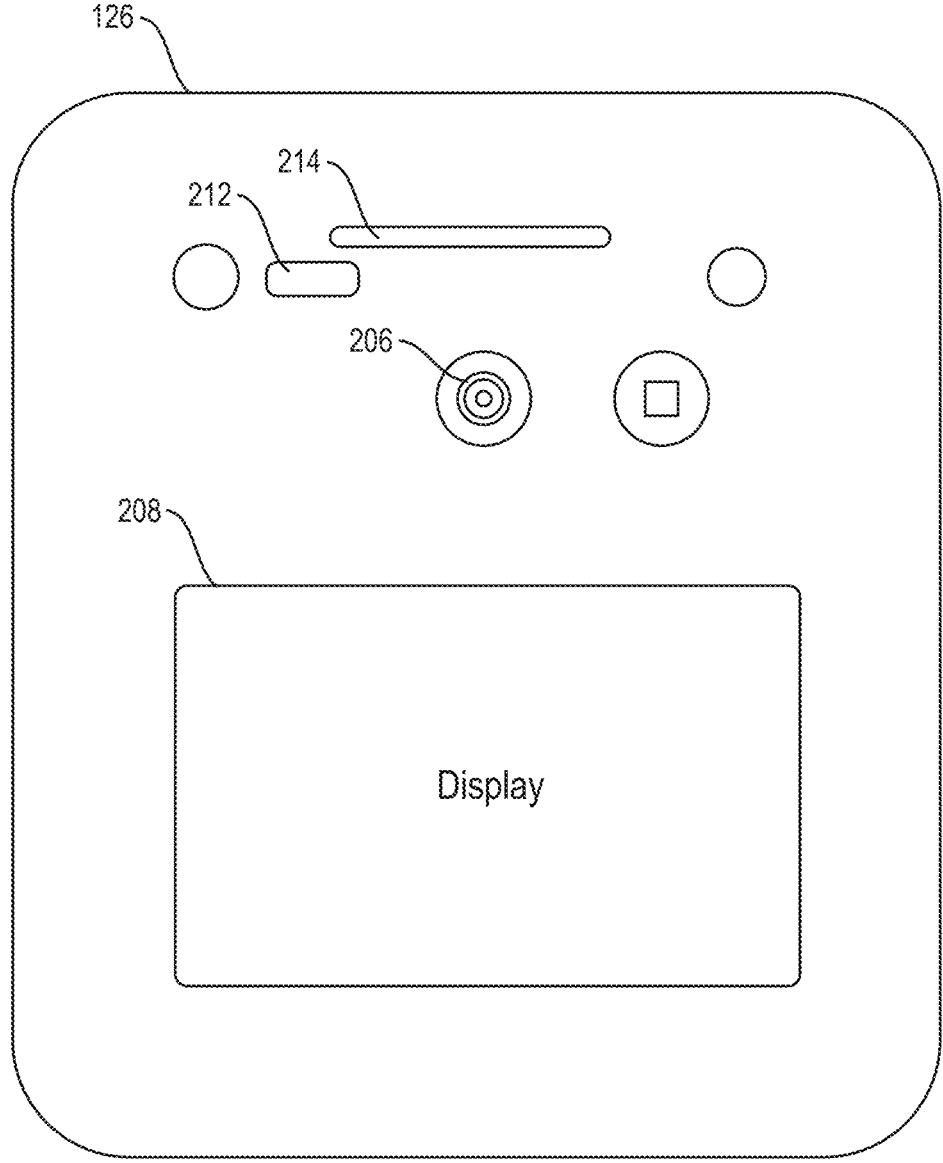
FIG. 3 illustrates a divestiture recommendation system according to one or more embodiments described herein.

According to one or more embodiments described herein, FIG. 3 illustrates an embodiment of the system 126, which can be referred to as a "divestiture recommendation system." In this example, the system 126 includes the camera 206, the display 208, the microphone 212, and the speaker 214 configured and arranged as shown. It should be appreciated that the system 126 can take other forms, and the components can be configured or arranged differently and can differ in their number. For example, multiple cameras, multiple displays, multiple microphones, and/or multiple speakers can be included in other embodiments. According to one or more embodiments described herein, the process performed by the divestiture recommendation engine 210 can be performed in an enclosure as shown in FIG. 3, which can be connected to the display 208 via a cable. According to one or more embodiments described herein, the components and engines of the system 126 can be integrated into a single device. For example, the system 126 can be a tablet computer configured to some or all of the features and functions described herein (e.g., the steps of the method 800).

Figures 4A, 4B:
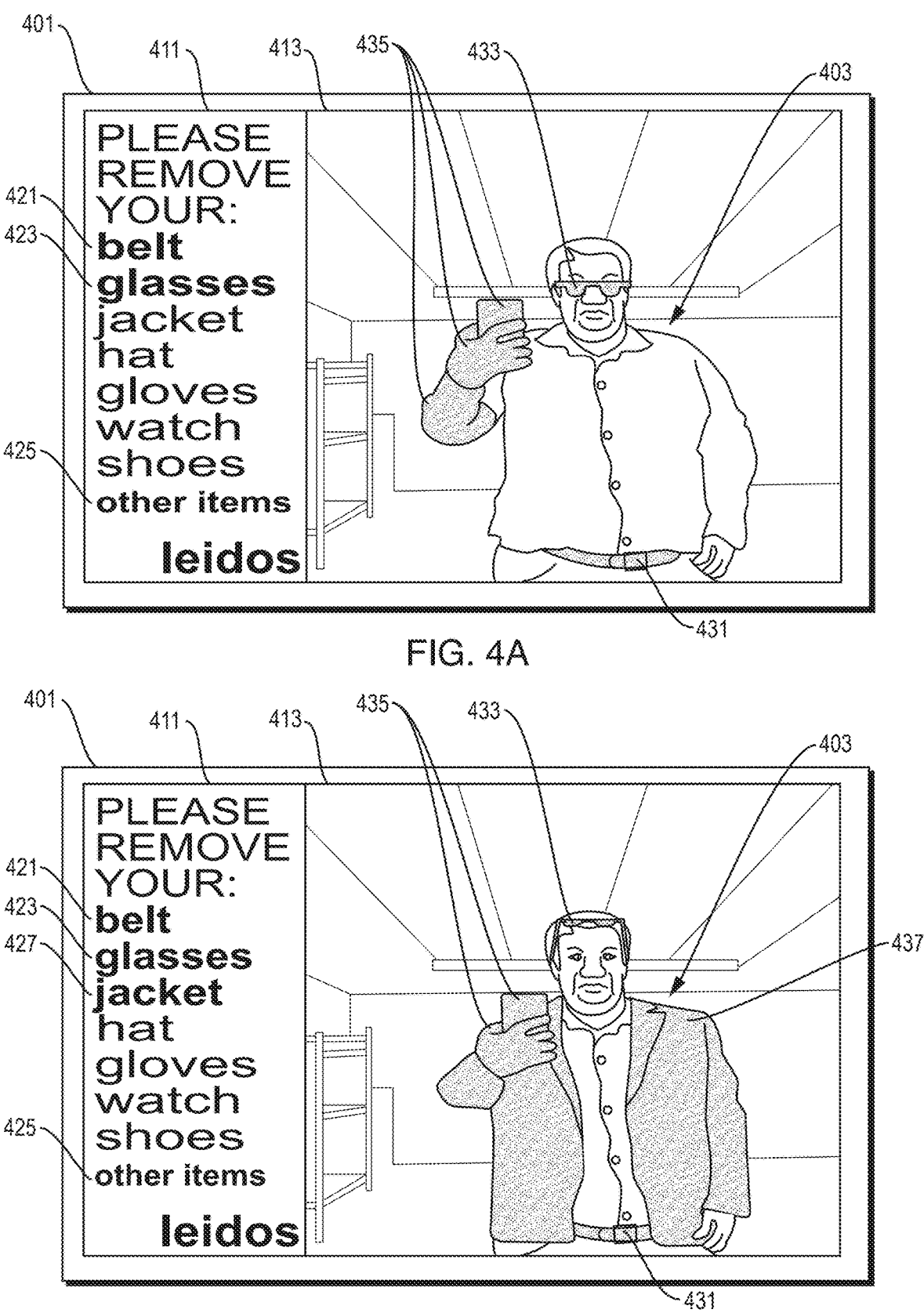
FIGS. 4A and 4B illustrate examples of an interface for providing divestiture recommendations according to one or more embodiments described herein.

FIGS. 4A and 4B illustrate examples of an interface 401 for providing divestiture recommendations according to one or more embodiments described herein. The interface 401 can be presented on the display 208 of the system 126 or on another suitable display. The interface 401 includes a text recommendation portion 411 and a visual recommendation portion 413. In some embodiments, the interface 401 does not include the text recommendation portion 411.

The text recommendation portion 411 provides text-based recommendations to an individual 403. For example, the text recommendation portion 411 can indicate to the individual 403 to "please remove your:" and then indicate which divestiture item(s) were identified by the divestiture recommendation engine 210. For example, in FIG. 4A, the text recommendation portion 411 indicates to the individual 403 that the following divestiture items were detected: a belt 421, glasses 423, and other items 425. In the example of FIG. 4B, the text recommendation portion 411 indicates to the individual 403 that the following divestiture items were detected: the belt 421, the glasses 423, other items 425, and a jacket 427. More particularly, in FIG. 4A, the individual 403 is not wearing a jacket, but as shown, in FIG. 4B, the individual 403 is wearing a jacket. As a result, the text recommendation portion 411 of FIG. 4A does not show "jacket" as an item to be divested; in contrast, the text recommendation portion 411 of FIG. 4B does show "jacket" as an item to be divested (e.g., jacket 427). According to one or more embodiments described herein, only the divestiture items that are detected are listed in the text recommendation portion 411.

The visual recommendation portion 413 provides a visual indication to the individual 403 corresponding to the divestiture items. For example, as shown in FIG. 4A, the visual recommendation portion 413 shows a real-time (or near-real-time) image or video of the individual 403 and uses an indicator to indicate the divestiture items on the individual 403. In FIG. 4A, indicators 431, 433, 435, which correspond to the divestiture items of the text recommendation portion 411 (e.g., the belt 421, the glasses 423, and the other items 425), are shown overlaid on the individual 403. In FIG. 4B, indicators 431, 433, 435, 437, which correspond to the divestiture items of the text recommendation portion 411 (e.g., the belt 421, the glasses 423, the other items 425, and the jacket 427), are shown overlaid on the individual 403.

As taught herein, the indicator can be a bounding box around the item, a mask overlaid on the item, an outline around the item, an avatar illustrating the item in a particular color or an avatar showing an animated removal of the item or an avatar with an arrow or other indicator pointing to or indicating the item for divestiture and/or the like including combinations and/or multiples thereof. For example, a mask can be generated that approximates the shape of a divestiture item detected on the individual 403 and can be overlaid on the real-time (or near-real-time) image or video of the individual 403 as shown in FIGS. 4A and 4B. As another example, a bounding box can be generated to partially or wholly surround the divestiture item detected on the individual 403 and can be overlaid on the real-time (or near-real-time) image or video of the individual 403. As yet another example, an outline of the item can be superimposed to partially or wholly outline the divestiture item detected on the individual 403 and can be overlaid on the real-time (or near-real-time) image or video of the individual 403.

According to one or more embodiments described herein, instead of a real-time (or near-real-time) image or video of the individual 403, an avatar or other digital representation of the individual 403 can be displayed on the visual recommendation portion 413. By using an avatar or digital representation, the face or other identifying features of the individual 403 are not displayed on the display 208. According to one or more embodiments described herein, a generic avatar or generic digital representation (e.g., an avatar or digital representation that is not based on the individual 403)

can be shown in the visual recommendation portion 413, and an indicator(s) can be used to depict the detected divestiture item(s) on the generic avatar. By using a generic avatar or generic digital representation, the face or other identifying features of the individual 403 are not displayed on the display 208.

Figure 5:
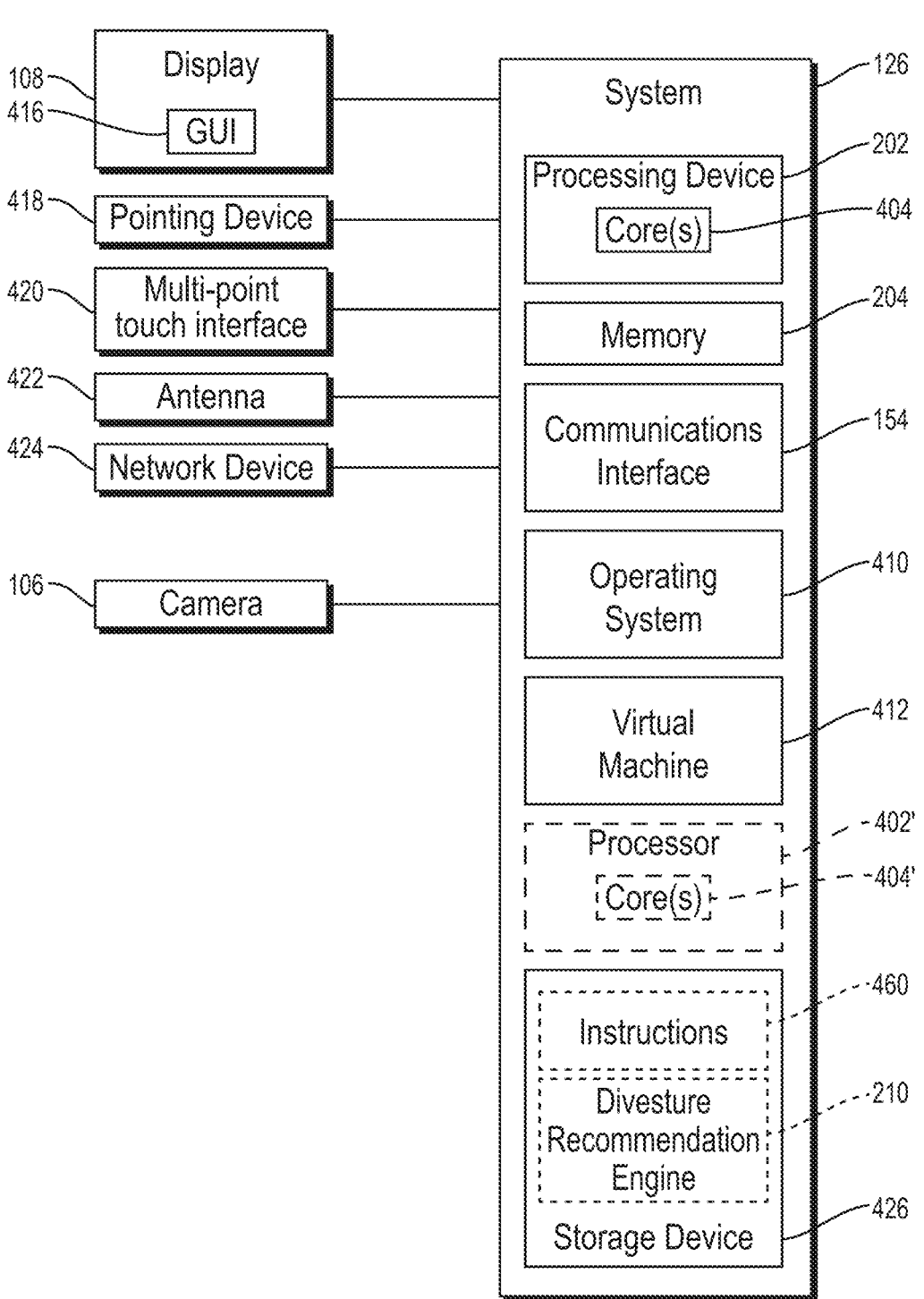
FIG. 5 schematically illustrates a computing device for use with some embodiments described herein.

FIG. 5 is a block diagram of the system 126 suitable for use with embodiments of the present disclosure. The system 126 may be, but is not limited to, a smartphone, laptop, tablet, desktop computer, server, or network appliance. According to one or more embodiments described herein, the system 126 is shown in FIG. 3. The system 126 includes one or more non-transitory computer-readable media for storing one or more computer-executable instructions or software for implementing the various embodiments taught herein. The non-transitory computer-readable media may include, but are not limited to, one or more types of hardware memory (e.g., memory 204), non-transitory tangible media (for example, storage device 426, one or more magnetic storage disks, one or more optical disks, one or more flash drives, one or more solid state disks), and the like. For example, memory 204 included in the system 126 may store computer-readable and computer-executable instructions 460 or software (e.g., instructions to perform a divestiture recommendation, etc.) for implementing operations of the system 126. The system 126 also includes configurable and/or programmable processor (e.g., processing device 202) and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 204 and other programs for implementing embodiments of the present disclosure. Processing device 202 and processor(s) 402' may each be a single core processor or multiple core (404 and 404') processor. Either or both of processing device 202 and processor(s) 402' may be configured to execute one or more of the instructions described in connection with system 126.

Virtualization may be employed in the system 126 so that infrastructure and resources in the system 126 may be shared dynamically. A virtual machine 412 may be provided to handle a process running on multiple processors so that the process appears to be using only one computing resource rather than multiple computing resources. Multiple virtual machines may also be used with one processor.

Memory 204 may include a computer system memory or random access memory, such as DRAM, SRAM, EDO RAM, and the like. Memory 204 may include other types of memory as well, or combinations thereof.

A user may interact with the system 126 through the display 208 (e.g., a computer monitor, a projector, and/or the like including combinations and/or multiples thereof), which may display one or more graphical user interfaces 416. The user may interact with the system 126 using a multi-point touch interface 420 or a pointing device 418.

The system 126 may also include one or more computer storage devices 426, such as a hard-drive, CD-ROM, or other computer readable media, for storing data and computer-readable instructions 460 and/or software that implement exemplary embodiments of the present disclosure (e.g., applications). For example, exemplary storage device 426 can include instructions 460 or software routines to providing divestiture recommendations. For example, the storage device 426 can include the divestiture recommendation engine 210 that can be applied to imaging data from the camera 206, for example, to provide divestiture recommendations.

The system 126 can include a communications interface 154 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the system 126 can include one or more antennas 422 to facilitate wireless communication (e.g., via the network interface) between the system 126 and a network and/or between the system 126 and components of the system such as the camera 206. The communications interface 154 may include a built-in network adapter, network interface card, PCMCIA network card, card bus network adapter, wireless network adapter, USB network adapter, modem or any other device suitable for interfacing the system 126 to any type of network capable of communication and performing the operations described herein.

The system 126 may run an operating system 410, such as versions of the Microsoft® Windows® operating systems, different releases of the Unix® and Linux® operating systems, versions of the MacOS® for Macintosh computers, embedded operating systems, real-time operating systems, open source operating systems, proprietary operating systems, or other operating system capable of running on the system 126 and performing the operations described herein. In exemplary embodiments, the operating system 410 may be run in native mode or emulated mode. In an exemplary embodiment, the operating system 410 may be run on one or more cloud machine instances.

Figure 6:
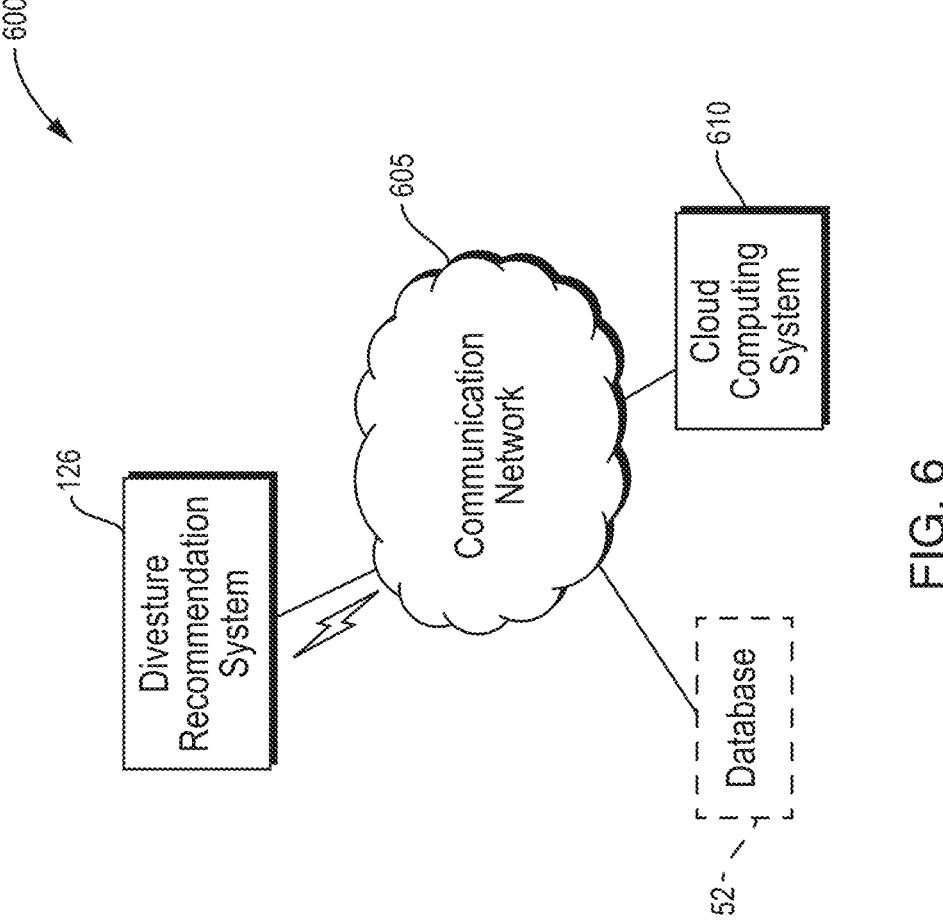
FIG. 6 schematically illustrates a network environment for use with the systems and methods of some embodiments described herein.

FIG. 6 illustrates a network environment 600 including the system 126 and other elements of the systems described herein that is suitable for use with exemplary embodiments. The network environment 600 can include the system 126, one or more databases 152, and a cloud computing system 610 that can communicate with one another via a communications network 605.

The system 126 can host one or more applications (e.g., instructions 460 or software to communicate with or control the camera 206, and any/or mechanical, motive, or electronic systems associated with these system aspects; divestiture recommendation engine 210; or graphical user interfaces 416) configured to interact with one or more components of the system 126 to facilitate access to the content of the databases 152. The databases 152 may store information or data including instructions 460 or software, the divestiture recommendation engine 210, or imaging data as described herein. Information from the databases 152 can be retrieved by the system 126 through the communications network 605, for example, while the camera 206 captures an image or video of an individual or after the camera 206 captures the image or video of the individual. The databases 152 can be located at one or more geographically distributed locations away from some or all system components (e.g., the camera 206) and/or the system 126. Alternatively, the databases 152 can be located at the same geographical location as the system 126 and/or at the same geographical location as the system components.

In an example embodiment, one or more portions of the communications network 605 can be an ad hoc network, a mesh network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a Wi-Fi network, a WiMAX network, an Internet-of-Things (IoT) network established using BlueTooth® or any other protocol, any other type of network, or a combination of two or more such networks.

According to one or more embodiments described herein, the divestiture recommendation engine 210 can be implemented in the cloud computing system 610. In such an arrangement, camera 206 associated with the system 126 can capture an image or video of an individual and transmit the image or video via the communications network 605 to the cloud computing system 610. The cloud computing system 610 can store the trained ML model 118 and can use the trained ML model 118 to perform inference 104, namely to detect a divestiture item associated with the individual in the image of the individual as described herein.

Figure 7:
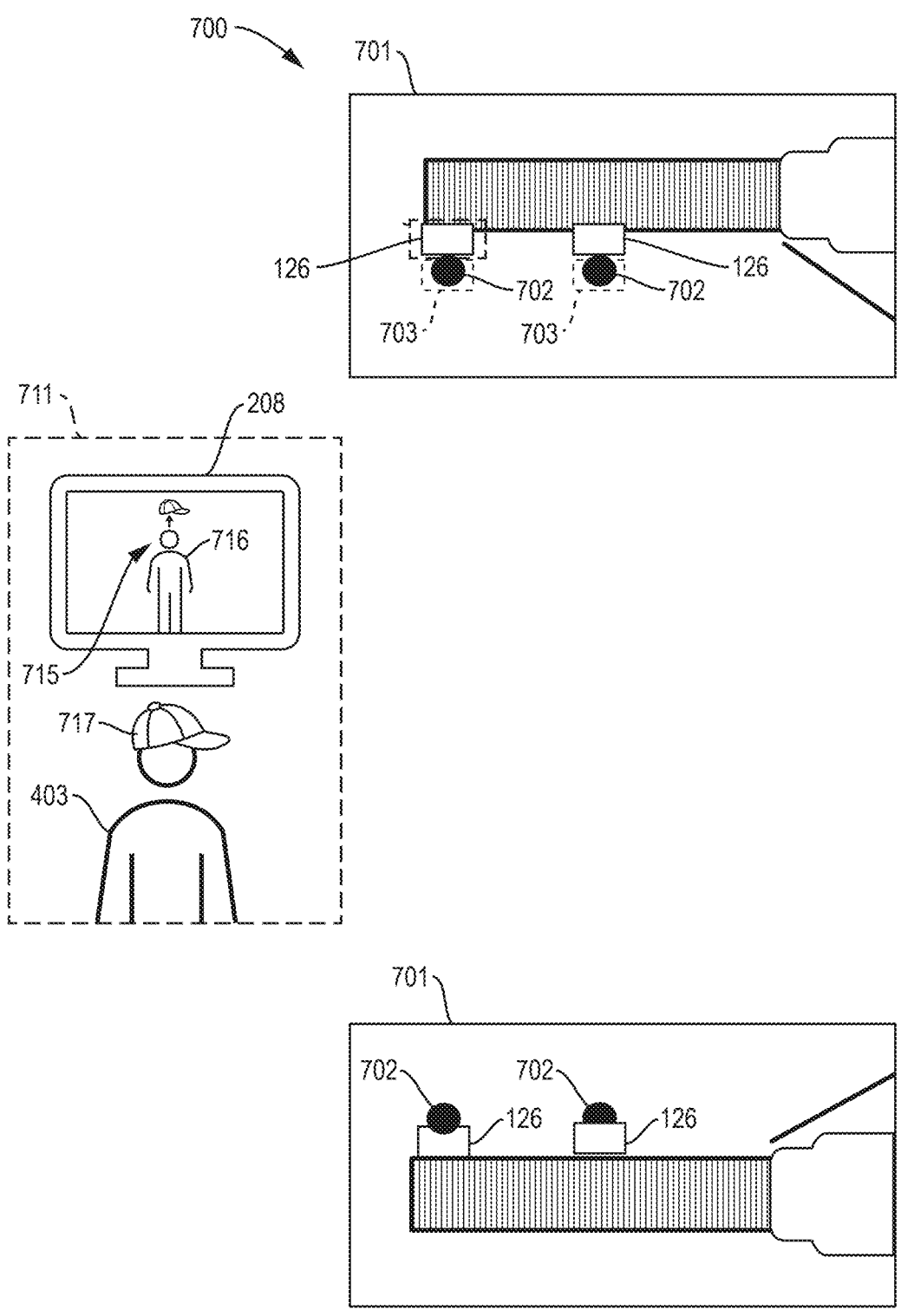
FIG. 7 illustrates a checkpoint having a divestiture recommendation system according to one or more embodiments described herein.

FIG. 7 illustrates an example checkpoint 700 having a divestiture recommendation system (e.g., the system 126) according to one or more embodiments described herein. In this example, the checkpoint includes multiple divestiture zones 701 each having multiple divestiture stations 702. As shown in this example, multiple divestiture stations 702 can be implemented with each having its own divestiture recommendation system (e.g., system 126) associated therewith. As shown, each divestiture station 702 includes the system 126 for providing divestiture recommendations as described herein. Particularly, each of the systems 126 can capture an image(s) of an individual at the respective divestiture stations 702. Using the captured image(s), the systems 126 can detect divestiture items, generate divestiture recommendations, and present the divestiture recommendations to the individual in real time without human intervention.

For example, when the individual 403 enters a query zone 703 of the divestiture zone 701, the camera 206 of the system 126 captures an image(s) and/or video(s) of the individual 403. It should be appreciated that each of the divestiture stations 126 can have a query zone 703. Using the captured image(s), the system 126 can detect a divestiture item, generate a divestiture recommendation 715, and present the divestiture recommendation 715 to the individual 403 on the display 208 in real time, as shown in the portion 711. According to one or more embodiments described herein, as shown in FIG. 7, the divestiture recommendation 715 provides an illustration to the individual 403 as an avatar 716 indicating that the individual 403 should remove a hat 717 worn by the individual 403. The individual 403 can then divest his or her divestiture item(s) (e.g., the hat 717) based on the divestiture recommendation 715, shown using the avatar 716, and can proceed to a next stage of the checkpoint 700. According to one or more embodiments described herein, the system 126 analyses the image(s) of the individual 403 using the trained ML model 118 but does not detect any divestiture items. In such cases, the individual 403 is considered "cleared" (e.g., does not have any divestiture items) and divestiture can be considered complete. Once divestiture is complete, the individual 403 can pass into another area or next stage.

Figure 8:
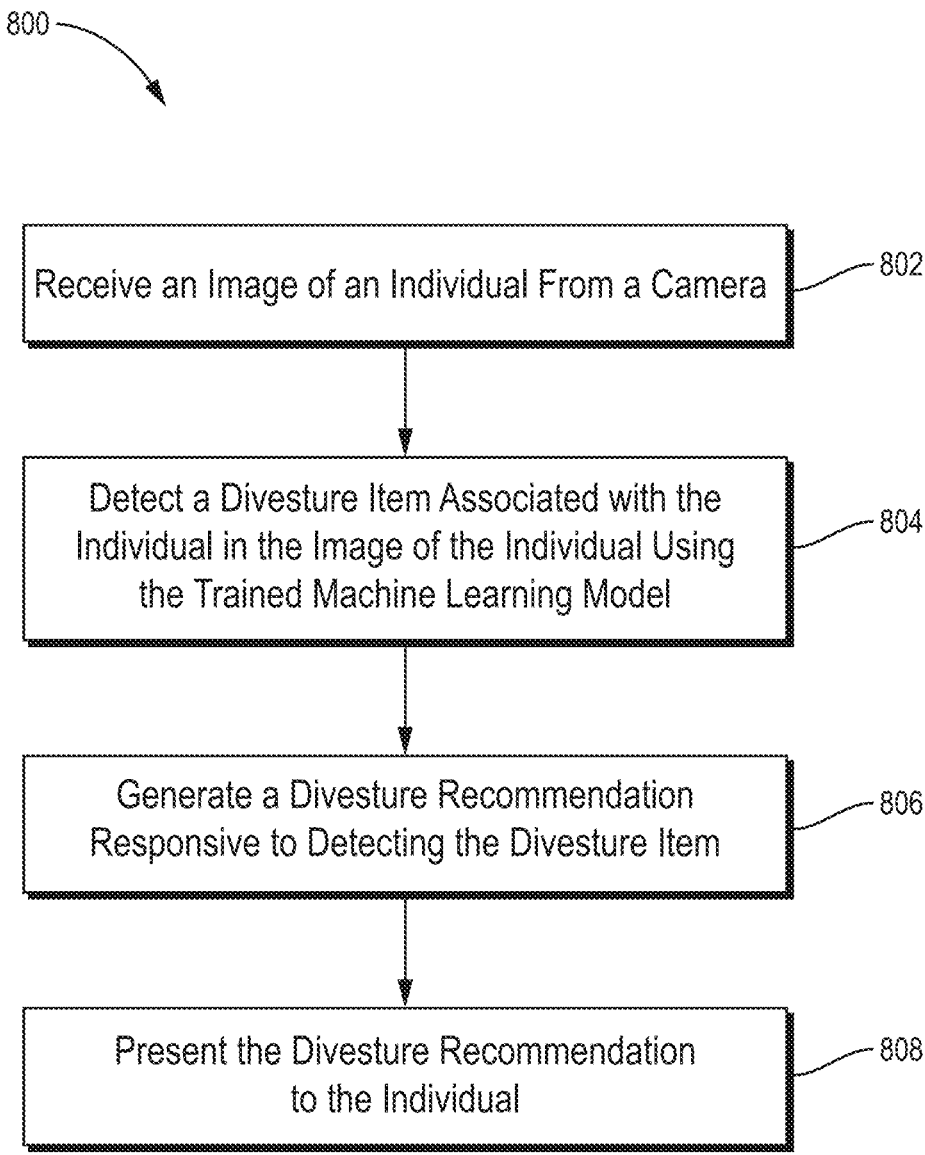
FIG. 8 illustrates a flow diagram of a method for providing visible and/or auditory feedback for a security checkpoint according to one or more embodiments described herein.

FIG. 8 illustrates a flow diagram of a method 800 for providing visual and/or auditory feedback, such as for divestiture recommendations, according to one or more embodiments described herein. The method 800 can be performed by any suitable system or device as described herein, such as the processing device 202, the system 126, the cloud computing system 610, the network environment 600, and/or the like including combinations and/or multiples thereof.

At block 802, the system 126 receives an image of an individual (e.g., the individual 403) from the camera 206. According to one or more embodiments described herein, the image can be a single image captured by the camera 206 or can be one or more of a series of images captured by the camera 206. For example, the camera 206 may continuously capture images (e.g., two images per second) of the individual. As another example, the image can be a frame that is extracted from a video captured by the camera 206.

At block 804, the system 126 detects a divestiture item associated with the individual in the image of the individual using the trained ML model 118. The divestiture item is one of a plurality of divestiture items on a divestiture list. For example, the divestiture list can define items that are subject to divestiture. As described herein, examples of divestiture items include, but are not limited to belts, glasses, jackets, hats, gloves, watches, and shoes. In some embodiment, the divestiture items can include alternative or additional items, such as scarfs, hair accessories, mobile phones, tablets, footwear, and/or the like including combinations and/or multiples thereof. Items on the divestiture list can vary by use case, by location, by regulations or laws, and/or the like including combinations and/or multiples thereof. For example, in some situations, a hat is considered a divestiture item while in other situations a hat is not considered a divestiture item. The trained ML model 118 takes as an input the image of the individual (e.g., from the camera 206), for example, a feature vector representing the image of the individual and generates as an output an indicator of the divestiture item, if any, and a label for the divestiture item. For example, the trained ML model 118 can detect the hat 807 worn by the individual 403 and can output an indicator (e.g., a mask associated with the divestiture item, an outline of the divestiture item, a bounding box associated with the divestiture item, and/or the like including combinations and/or multiples thereof) and in some embodiments a label (e.g., "hat") for the divestiture item.

At block 806, the system 126 generates a divestiture recommendation responsive to detecting the divestiture item. For example, the divestiture recommendation can be a recommendation to remove the divestiture item. The divestiture recommendation can be based on a threshold. For example, the trained ML model 118 can provide a confidence score associated with the detection of a divestiture item. In such cases, the confidence score can be compared to a threshold, and if the confidence score satisfies the threshold, the system 126 generates the divestiture recommendation to divest the item. For example, if the trained ML model 118 generates a confidence score of 0.81 for the hat 807, and the threshold is 0.80, the system 126 generates a divestiture recommendation (e.g., "remove the hat"). The threshold can be preset and/or can be adjustable. According to one or more embodiments described herein, the threshold can be set for each category of divestiture items. For example, one category of divestiture item (e.g., "hats") can have a higher or lower threshold relative to another category of divestiture item (e.g., "coats").

At block 808, the system 126 presents, on the display 208 and/or using the speaker 214, the divestiture recommendation to the individual. According to one or more embodiments described herein, the recommendation is provided as an auditory recommendation. According to one or more embodiments described herein, the recommendation is provided as a visual recommendation. According to one or more embodiments described herein, the feedback is provided as a multimodal recommendation. In the case of visual feedback, the divestiture recommendation can be text (e.g., "Please remove your hat."), video (e.g., a video showing how to remove a hat), animation (e.g., an animation showing how to remove a hat), and/or the like including combinations and/or multiples thereof. In the case of auditory feedback, the divestiture recommendation can be audio (e.g., a spoken instruction indicating "Please remove your hat."). In some cases, the divestiture recommendation can be multimodal (e.g., text and video, text and animation, and/or the like including combinations and/or multiples thereof).

It should be appreciated that the system 126 performs the steps of the method 800 relatively quickly (i.e., in real time) so as to not delay the individual 403 passing through the checkpoint 700, 800. The system 126 can capture the image, detect the divestiture item, generate a divestiture recommendation, and present the divestiture recommendation in less than two seconds according to one or more embodiments described herein.

Additional processes also may be included, and it should be understood that the processes depicted in FIG. 8 represent illustrations, and that other processes may be added or existing processes may be removed, modified, or rearranged without departing from the scope and spirit of the present disclosure. It should also be understood that the processes depicted in FIG. 8 may be implemented as programmatic instructions stored on a non-transitory computer-readable storage medium that, when executed by a processor (e.g., the processing device 202) of a computing system (e.g., the system 126), cause the processor to perform the processes described herein.

In describing example embodiments, specific terminology is used for the sake of clarity. Additionally, in some instances where a particular example embodiment includes multiple system elements, device components or method steps, those elements, components or steps may be replaced with a single element, component, or step. Likewise, a single element, component, or step may be replaced with multiple elements, components, or steps that serve the same purpose. Moreover, while example embodiments have been illustrated and described with references to particular embodiments thereof, those of ordinary skill in the art will understand that various substitutions and alterations in form and detail may be made therein without departing from the scope of the present disclosure. Further still, other aspects, functions, and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system for providing visual feedback to individuals at a security checkpoint, the system comprising:
   a camera;
   a display; and
   a processing system comprising:
      a memory storing computer readable instructions and a trained machine learning model; and
      a processing device for executing the computer readable instructions, the computer readable instructions controlling the processing device to perform operations comprising:

receiving an image of an individual from the camera;

detecting at least one non-threat item associated with the individual in the image of the individual using the trained machine learning model, the at least one non-threat item being one of a plurality of non-threat items of interest, the non-threat items of interest are items to be divested prior to an initial screening, the trained machine learning model taking as an input the image of the individual and generating as an output an indicator of the at least one non-threat item of interest detected;

generating a divestiture recommendation for the individual responsive to detecting the at least one of the non-threat items in the image of the individual; and presenting to the individual, on the display, the divestiture recommendation as the visual feedback.

2. The system of claim 1, wherein the trained machine learning model is trained for a non-threat divestiture use case.

3. The system of claim 1, wherein the indicator is a bounding box around the item overlaid on the image or a video of the individual.

4. The system of claim 1, wherein the indicator is a mask of the item overlaid on the image or a video of the individual.

5. The system of claim 1, wherein the indicator is an outline around the item overlaid on the image or a video of the individual.

6. The system of claim 1, wherein the camera, the display, and the processing system are integrated into a housing.

7. The system of claim 1, further comprising a microphone and a speaker.

8. The system of claim 1, wherein the trained machine learning model is based on a region based convolutional neural network (R-CNN) architecture.

9. The system of claim 1, wherein the divestiture recommendation is presented as text.

10. The system of claim 1, wherein the divestiture recommendation is presented as an animation.

11. The system of claim 1, wherein the indicator is overlaid on the image or a video of the individual.

12. The system of claim 1, wherein the indicator is overlaid on a digital representation.

13. The system of claim 12, wherein the digital representation is an avatar.

14. The system of claim 1, wherein the trained machine learning model outputs a label for the item.

15. The system of claim 1, wherein the image is a frame extracted from a video of the individual.

16. A system for providing auditory feedback to individuals at a security checkpoint, the system comprising:

a camera;

a speaker; and a processing system comprising:

a memory storing computer readable instructions and a trained machine learning model; and a processing device for executing the computer readable instructions, the computer readable instructions controlling the processing device to perform operations comprising:

receiving an image of an individual from the camera;

detecting at least one non-threat item associated with the individual in the image of the individual using the trained machine learning model, the at least one non-threat item being one of a plurality of non-threat items of interest, the non-threat items of interest are items to be divested prior to an initial screening, the trained machine learning model taking as an input the image of the individual and generating as an output an indicator of the at least one non-threat item of interest detected;

generating a divestiture recommendation for the individual responsive to detecting the at least one of the non-threat items in the image of the individual; and presenting to the individual, using the speaker, the divestiture recommendation as the auditory feedback.

17. The system of claim 16, wherein the auditory feedback is a spoken instruction.

18. The system of claim 16, wherein the system further comprises a display, wherein the operations further comprise presenting to the individual, using the display, the divestiture recommendation as visual feedback.

19. A computer-implemented method for providing visual feedback to individuals at a security checkpoint, the computer-implemented method comprising:

receiving an image of an individual;

detecting at least one non-threat item associated with the individual in the image of the individual using a trained machine learning model, the at least one non-threat item being one of a plurality of non-threat items of interest, the non-threat items of interest are items to be divested prior to an initial screening, the trained machine learning model taking as an input the image of the individual and generating as an output an indicator of the at least one non-threat item of interest detected;

generating a divestiture recommendation for the individual responsive to detecting the at least one of the non-threat items in the image of the individual; and presenting to the individual, on a display, the divestiture recommendation as the visual feedback.

20. The computer-implemented method of claim 19, further comprising presenting, using a speaker, the divestiture recommendation to the individual as auditory feedback.

21. A computer program product comprising a non-transitory computer readable storage medium having program instructions embodied therewith, the program instructions executable by a processor to cause the processor to perform operations for providing visual feedback to individuals at a security checkpoint, the operations comprising:

receiving an image of an individual from a camera;

detecting at least one non-threat item associated with the individual in the image of the individual using a trained machine learning model, the at least one non-threat item being one of a plurality of non-threat items of interest, the non-threat items of interest are items to be divested prior to an initial screening, the trained machine learning model taking as an input the image of the individual and generating as an output an indicator of the at least one non-threat item of interest detected;

generating a divestiture recommendation for the individual responsive to detecting the at least one non-threat items in the image of the individual; and presenting to the individual, on the display, the divestiture recommendation as the visual feedback.

* * * * *